No. 12,001. Reissued June 17, 1902.

W. S. SHARPNECK.

CENTRIFUGAL PUMP.

(Application filed Jan. 13, 1902.)

Witnesses,

F. D. Mann,

A. N. Graves,

Inventor,

William S. Sharpneck,

By Offield Towle & Linthicum,

Atty's.

THE NORRIS PETERS CO., PHOTO-LITHO., WASHINGTON, D. C.

UNITED STATES PATENT OFFICE.

WILLIAM S. SHARPNECK, OF CHICAGO, ILLINOIS, ASSIGNOR TO JOHN D. ROSS AND EVERETT W. BROOKS, OF CHICAGO, ILLINOIS.

CENTRIFUGAL PUMP.

SPECIFICATION forming part of Reissued Letters Patent No. 12,001, dated June 17, 1902.

Original No. 644,475, dated February 27, 1900. Application for reissue filed January 13, 1902. Serial No. 89,608.

*To all whom it may concern:*

Be it known that I, WILLIAM S. SHARPNECK, a citizen of the United States, residing at Chicago, in the county of Cook and State of Illinois, have invented a certain new and useful Improvement in Centrifugal Pumps, of which the following is a specification, reference being had to the accompanying drawings.

This improvement relates to that class of centrifugal pumps which have a vertical shaft; and its object is to provide a pump of this class that will be cheaply made, rapid in work, easy to operate, and not likely to get out of order.

To these ends the invention consists in the peculiar construction hereinafter more particularly described and then definitely claimed at the end hereof.

Figure 1:
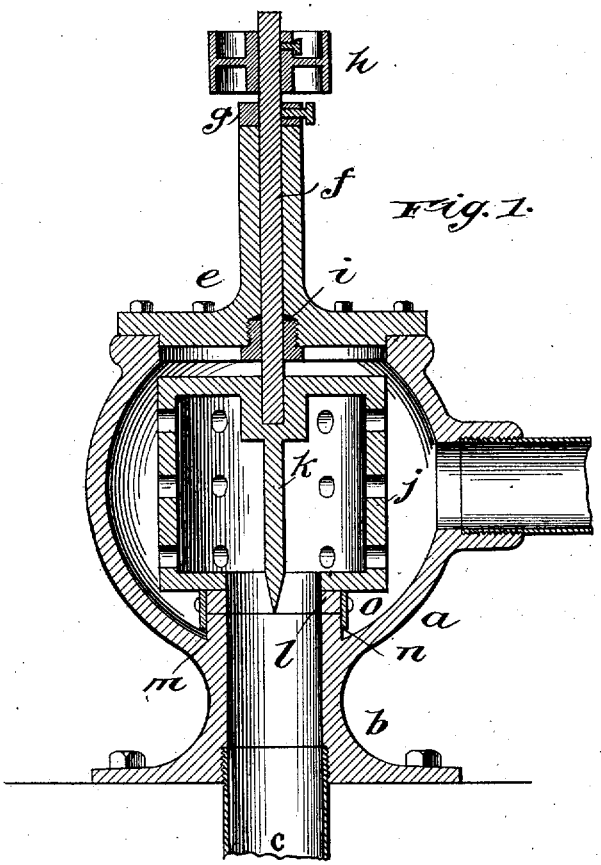
Figure 2:
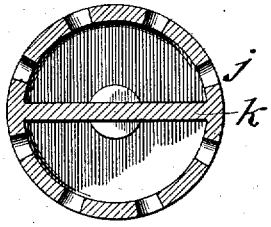
Figure 3:
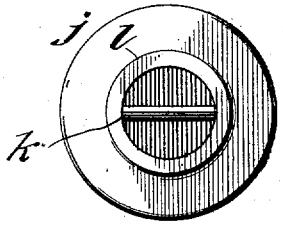

In the accompanying drawings, Figure 1 is a vertical central section of a pump constructed according to my improvement. Fig. 2 is a horizontal section through the center of the revolving cylinder. Fig. 3 is a reversed plan of the same.

Referring now to the details of the drawings by letters, *a* is the casing, provided with a base *b*, in which is secured the vertical suction-pipe *c*, and a horizontal discharge-pipe *d* projects from one side of the casing. At the top of the casing is a cap *e*, securely bolted thereto, in which runs the shaft *f*, having a collar *g* secured on it by a set-screw. Above this collar is set a band-pulley *h* for giving motion to the shaft *f*. The lower part of the shaft runs through a stuffing-box *i*, so as to be water-tight, and on the bottom of such shaft is hung the revolving cylinder *j*, which is perforated for the passage of the water and is provided with a partition *k*, whose bottom is preferably brought down to a knife-edge, as shown in Figs. 1 and 3.

The bottom of the revolving chamber terminates in a neck *l*, which is in line with a corresponding neck *m*, rising in the interior of the casing. These two necks should be nicely fitted together, so as to run with but little, if any, friction, which can be arranged by properly adjusting the collar *g*. In some cases I may secure to the neck *l* a packing-ring *n* by a band *o*, which ring will drop around the neck *n*, and the pressure of the water around it will keep the joint perfectly tight; but this packing is not essential in all cases.

The object of the partition is to prevent the cylinder from running around over the water, and thus wasting power, for the partition drives the water outward and the centrifugal force forces it through the holes in the periphery of the cylinder into the casing and then through the discharge.

The outside of the cylinder is intended to be turned smooth, so as to run with but little friction in the water in the casing.

A restatement of the above-described invention in order to more fully disclose its principles of operation and characteristic features of construction is as follows: As appears from the foregoing description, the rotary piston constitutes a chamber whose only outlet is through restricted outlet-passages, and within this chamber are located the impelling-vanes. The inclosing casing is of such internal size and form that the peripheral outlets of the piston are unobstructed at all parts of the revolution. The efficiency of the pump may be explained by and is believed to be in part at least due to the following considerations: The incoming body of liquid enters the hollow piston of the axis thereof which obviously has the slowest relative rate of movement, the acceleration of movement and its change in direction being gradual, and therefore economical of power. Arrived fully within the rotating chamber the flow of the liquid is radially toward the peripheral outlets; but meantime the peripheral walls of the piston are traveling with the body of liquid contained therein, so that practically no power is expended in overcoming frictional retarding effect of the body of water surrounding the piston and which has passed beyond the action of the impelling-vanes, since the liquid within the piston is separated from that without the same by the peripheral walls of the piston. The exterior and interior of the piston being circumferentially smooth and circular, the power required to rotate the same is reduced to a minimum.

It is probable also that the comparatively closed form of hollow piston produces or maintains a more perfect vacuum in the piston, which would of course keep the piston more perfectly filled, and hence make the pump more effective.

The liquid which is passing through the pump is subject to two impelling forces—namely, the atmospheric pressure, which is the initial force induced by the exhaust action of the pump and which would alone tend to cause the liquid to flow in direct lines axially through the pump, and the centrifugal force which tends to cause the liquid to flow out of the pump in a direction at right angles to the axis of rotation of the piston. These two forces are acting together, and it follows that the resultants thereof will be curved lines which extend parallel with the axis at a point of no rotation and diverge from the axis as the speed of rotation increases. It follows that the liquid if unguided mechanically will flow toward the periphery of the piston along these curved lines or resultants of the two impelling forces acting simultaneously; but it will of course be understood that the flow of liquid is not directly through the pump, but in spirals, since it is rotating with the piston during its forward flow, and it is, in fact, this very rotation through which it acquires the centrifugal force which deflects it from the axis. As to those portions of the incoming liquid which enter at and near the axis of rotation of the piston it will be evident that it will acquire rotation relatively slowly, and hence will partake of the centrifugal force but little at first and will therefore travel through the piston axially a relatively long distance along a relatively flat curve, leaving out of consideration its spiral path. It will also be evident that this curved resultant will be a curve of constantly-increasing angle, since the liquid will constantly be accelerated. As to such portions of the incoming liquid as enter the piston at those portions of the inlet most remote radially from the axis of rotation, this liquid will obviously acquire a high speed of rotation much more rapidly than that entering at the axis and will therefore be deflected outward toward the periphery upon a much more abrupt or sharper curve, so that the two extreme resultants will not only be curved, but will be divergent with relation to each other—that is to say, the resultants, considered from the innermost or most nearly axial one to the outermost, will be of successively sharper curve, and hence any two will be divergent outwardly with relation to each other. It follows, therefore, that the zone of delivery or area of the piston through which the liquid escapes must, in order to subtend all the resultants (which it must do if theoretically correct,) be of a width greater than one-half the diameter of the inlet or greater than the length of the radius which would reach from the most nearly axial to the most axially remote points of inlet. It follows from the foregoing consideration that the piston to be most effective must have a zone of discharge wide enough, measured axially, to comprehend or substantially comprehend these two extreme resultants. It will also be obvious that the end of the piston opposite the inlet thereof should be sufficiently removed from said inlet to be substantially out of the range of these resultants, since otherwise the liquid will in following these resultants encounter the said end wall, and whatever impact is thus caused will to a corresponding extent decrease the efficiency of the pump.

While it follows from the above considerations that the zone of delivery should be wide, it nevertheless remains true that the piston in order to work most effectively should be restricted as to its area of outlet to correspond to the difference in velocities obtaining between the point of entrance to the piston and the point of discharge. Applying the foregoing analysis to the construction shown and described, it will be seen that the length of the perforated portion of the piston—*i. e.*, the width of its discharge zone—is such as to substantially comprehend these resultants of impelling forces and that the outlets of the piston are not only distributed over the zone intervening between these divergent resultants, but they are also of such restricted areas as to bear the proper relation in the aggregate to the inlet area of the piston.

In practice it is generally assumed that each given head corresponds to a definite peripheral speed of the piston or runner in order to secure the highest economy. It will be obvious that as the diameter of the piston or runner at the zone of delivery is increased the rate of rotation at and near the axis will be relatively decreased for any given peripheral speed, and it further follows, from the considerations hereinbefore expressed, that with a given peripheral speed the larger the diameter of the piston the more remote, measured axially of the piston, will be the mean resultant of delivery. Furthermore, the relative area of the inlet to the diameter of the piston at the zone of delivery also has a direct bearing upon this matter, and the smaller the diameter of the inlet the greater will be the distance from the inlet, measured axially, where the mean resultant intersects the zone of delivery, since the liquid will in such cases enter a relatively slower moving part of the piston and will therefore partake of the movement of rotation more gradually. It is to be noted in this connection that the liquid acquires a certain amount of rotation before it actually enters the piston, since the body of liquid within the piston which is being positively rotated will induce a rotation in the incoming stream, and in the particular embodiment of pumps shown herein this action is augmented by extending the pallet beyond or outside of the piston and into the suction-pipe. The rotation thus imparted to the incoming stream is important, for the reason that it prevents or lessens the impact which otherwise would occur when the liquid actually came within the range of the pallet member within the piston.

It follows from the foregoing that the details of construction of the pump may be varied without departure from the invention, so long as its characteristic features be present, that the particular position of the pump with reference to the vertical or horizontal is immaterial in the broader sense of the invention, since this pump in common with other centrifugal pumps will operate in any position, and that the particular disposition and number of peripheral outlets of the hollow or chamber-like piston is not essential to the operativeness of the pump.

I claim as my invention—

1. In a centrifugal pump, the combination of a suitable casing, a hollow rotary piston arranged therein, having peripheral walls internally and externally substantially circular and concentric with the axis of rotation of the piston, discharge-outlets at the periphery of said piston, of restricted size, one or more internal pallet-blades extending radially, and an axial inlet, said discharge-outlets being distributed over a zone of greater width than one-half the diameter of the inlet.

2. In a centrifugal pump, the combination of an outer casing, a rotatable piston-shaft arranged to extend through one of the end walls of said casing, a hollow cylindric rotary piston supported upon said shaft within said casing, a discharge-passage in said casing, an inlet-passage extending through that end of the casing opposite that through which the rotary shaft enters, said hollow piston being provided with an axial inlet arranged to register with, and contiguous to, the inner end of said inlet-passage of the casing, a longitudinally and diametrically disposed partition within said hollow piston constituting pallet-blades and a plurality of peripheral outlet-passages of restricted size extending through the side walls of said piston, said outlet-passages being arranged to extend over a zone of an axial length not less than one-half the diameter of the inlet, substantially as described.

3. In a centrifugal pump, a hollow rotary piston having an axial inlet, one or more pallet members and peripheral outlets distributed or extending over an axial length of the piston substantially comprehending the resultant divergent angles of delivery of the liquid induced by the impelling forces.

4. In a centrifugal pump, a hollow rotary piston having an axial inlet, one or more pallet members and peripheral outlets distributed or extending over the axial length of the piston substantially comprehending the resultant divergent angles of delivery of the liquid induced by the impelling forces, the total area of discharge of the piston being less than the inlet area thereof, for the purposes set forth.

5. In a centrifugal pump, a hollow rotary piston having an axial inlet, one or more pallet members and peripheral outlets, the end wall of the piston opposite said inlet being located substantially out of range of the resultant lines of delivery of the liquid induced by the impelling forces.

6. In a centrifugal pump, a hollow rotary piston having an axial inlet, one or more pallet members and peripheral outlets distributed or extending over an axial length of the piston substantially comprehending the resultant divergent angles of delivery of the liquid induced by the impelling forces and provided with a closed end wall opposite the axial inlet and located substantially out of range of said resultant angles of delivery.

7. In a centrifugal pump, a hollow rotary piston having an axial inlet, one or more pallet members moving with the piston, peripheral outlets distributed or extending over an axial length of the piston substantially comprehending the resultant divergent angles of delivery of the liquid induced by the impelling forces and unguided and a closed end wall opposite the axial inlet of the piston located sufficiently remote from said inlet to be substantially out of range of the resultant lines of delivery of the pump, the total area of discharge of the piston being much less than the total area of inlet, as and for the purposes set forth.

8. In a centrifugal pump, a hollow rotary piston having an axial inlet, one or more pallet members inside of and rotating with the piston, and peripheral outlets, the axial length of said piston and its diameter at the delivery zone bearing such relation to each other that the mean of the resultants of delivery of the liquid induced by the impelling forces passes through said delivery zone.

9. In a centrifugal pump, a hollow rotary piston provided with peripheral outlets and an inlet the mean of the area of which is relatively nearer the axis of rotation of the piston than said peripheral outlets, one or more pallet members inside of and rotating with the piston and means for rotating the piston, the axial length of said piston and its diameter at the delivery zone bearing such relation to each other that the mean of delivery of the liquid induced by the impelling forces passes through said delivery zone and said zone of delivery being of a width considered longitudinally, to substantially comprehend said resultant angles of delivery.

10. In a centrifugal pump, a hollow rotary piston provided with an axial inlet and peripheral outlets and an axial extension pallet member extending into the inlet-pipe beyond the main body of the piston having its plane substantially parallel with the axis of rotation of the piston, whereby an effective rotative movement is imparted to the inflowing column of liquid before it comes within the path of said extension pallet member.

11. In a centrifugal pump, a piston provided with an axial end inlet, one or more internal pallet members and peripheral outlets distributed or extending over a delivery zone wider, measured longitudinally of the piston, than one-half the mean diameter of the inlet thereof.

12. In a centrifugal pump, a hollow rotary piston having an axial end inlet, one or more pallet members inside of and rotating with the piston and delivery outlets more remote radially from the axis of rotation of the pump than the inlet thereof, said outlets extending over a delivery zone wider than one-half the mean diameter of the inlet.

13. The combination of the vertical casing *a*, provided with an outlet *d*, base *b* having a central opening, and a neck *m*, with a revolving perforated cylinder *j* having a neck *l* and a partition *k* extending into the neck, substantially as described.

14. The combination of the vertical casing *a* having a base *b*, neck *m*, and a cap *e* provided with a stuffing-box on its under side and a bearing formed in an extension of said cap *e* with a revolving perforated cylinder having a neck *l* and a packing-ring *n* attached to one of said necks and embracing the other, substantially as described.

15. The combination in a centrifugal pump, of the vertical casing *a* having a suction-pipe *c*, discharge-pipe *d*, cap *e* and neck *m*, with the vertical shaft *f* running in said cap, the adjustable collar *g* mounted on said shaft, the perforated revolving vertical cylinder carried thereby having a partition *k*, a neck *l* surrounding the inlet into the cylinder and a band *n* fast on said neck *l* and loosely inclosing the neck *m*, all substantially as described and shown.

WILLIAM S. SHARPNECK.

Witnesses:

ALBERT H. GRAVES,

FREDERICK C. GOODWIN.